US005603880A

United States Patent [19]

Kato et al.

[11] Patent Number: 5,603,880

[45] Date of Patent: Feb. 18, 1997

[54] METHOD AND APPARATUS FOR MANUFACTURING TABLETS

[75] Inventors: Heizaburo Kato, Shizuoka-ken; Yuki Tsushima, Honjo; Takayuki Ohwaki, Inuyama; Masaharu Nakajima, Saitama-ken; Yutaka Morita, Honjo, all of Japan

[73] Assignee: Sankyo Seisakusho Co., Tokyo, Japan

[21] Appl. No.: 494,922

[22] Filed: Jun. 26, 1995

[30] Foreign Application Priority Data

Jul. 7, 1994 [JP] Japan .................................... 6-155900

[51] Int. Cl.$^{6}$ .................................................... B29C 43/06

[52] U.S. Cl. ............................................ 264/112; 264/120

[58] Field of Search .................................... 264/112, 120, 264/109; 425/347, 356

[56] References Cited

U.S. PATENT DOCUMENTS

| | | | |
|---|---|---|---|
| 2,886,849 | 5/1959 | Brierley . | |
| 2,970,554 | 2/1961 | Haupt | 425/347 |
| 3,175,521 | 3/1965 | Hershberg | 425/347 |
| 3,616,493 | 11/1971 | Okubo et al. | 425/347 |
| 5,087,398 | 2/1992 | Le Molaire et al. | 264/112 |

FOREIGN PATENT DOCUMENTS

| | | |
|---|---|---|
| 0354172 | 7/1990 | European Pat. Off. . |
| 462710 | 10/1968 | Switzerland . |

OTHER PUBLICATIONS

"Pharmaceutical Dosage Forms: Tablets" vol. 3. 2nd Ed. Herbert A. Lieberman, Leon Lachman, and Joseph B. Schwartz.

"Pharmaceutical Sciences" 1990, Alfonso R. Gennaro.

*Primary Examiner*—Mary Lynn Theisen

*Attorney, Agent, or Firm*—Harness Dickey & Pierce P.L.C.

[57] ABSTRACT

It is an object of the present invention to realize a method and an apparatus for efficiently mass-producing tablets of high mechanical strength, accuracy and quality which are so excellent in solubility and collapsibility that they can be easily taken by persons of advanced ages and infants. By using a turn table and endless belt means to which a number of dies are connected, a part of which turn table contacts with the endless belt means, the turn table and the endless belt means being adapted to relatively move with respect to each other, receptacles are formed by pressing plastic polymer film in mold cavities of the dies. Moist powder supplied from a hopper into filling holes of the turn table is pressurizingly filled in the receptacles by means of a filling and pressurizing device in the region where the turn table is laid above the endless belt means. The surface of this pressurizingly-filled moist powder is leveled by removing the excessive powder when the endless belt means is relatively moved with respect to the turn table, thus forming a tablet. Then, the surface of the moist powder is chamfered, the mass of the moist powder is treated by a dryer, the receptacles are closed by a sealing unit, and they are cut by a predetermined number by a cutting device, thereby finishing tablet products.

29 Claims, 3 Drawing Sheets

METHOD AND APPARATUS FOR MANUFACTURING TABLETS

BACKGROUND OF THE INVENTION

The present invention relates to a method and apparatus for manufacturing tablets of moist powder.

Conventionally, tablets are classified into molded tablets and compressed tablets. These two kinds of tablets have been manufactured by different methods. The molded tablets are manufactured by kneading an additive agent such as an excipient or a binder into medical ingredients to form a mixture, adding a solvent such as water, ethanol or the like into the mixture to produce moist powder, and forming the moist powder to have a predetermined shape by molding. There are two methods of forming the moist powder into the tablets, one of which is a thrust-filling method in which the moist powder is forcibly pressed into a die having a certain shape, and the other of which is a die-punching method in which the moist powder is processed into a plate-like material by a rolling machine and a die of a certain shape is pressed against the material for punching. The molded tablets exhibit superior solubility and collapsibility when they are taken by a patient. However, it is difficult to deal with the moist powder during manufacturing the tablets. Particularly, when the moist powder is pushed out of the die, the moist powder tends to stick to the surface of an ejector pin or rod so that there occurs dispersion in weight of tablets to be products, the surface of the tablet becomes rough, or the tablet is liable to be worn or broken because its mechanical strength is insufficient. Thus, the molded tablets are disadvantageous in respect of efficiency of production, accuracy and quality. Therefore, the molded tablets have been hardly manufactured at present.

Meanwhile, almost all the tablets now available in the market belong to the compressed tablets. An apparatus for manufacturing the compressed tablets molds dry granules at a relatively high pressure of 100 to several thousands $kg/cm^2$. This machine is generally called a tablet machine. The tablet machine comprises an upper rod, a lower rod and a mill. By applying force from the upper and lower rods to the granules supplied in the mill, the granules are pressurized and instantaneously formed into a tablet. A rotary-type tablet machine ordinarily includes 10 to 100 sets of an upper rod, a lower rod and a mill which are attached to a turn table. By using the rotary-type tablet machine, it is possible to manufacture tablets of the same number as that of the sets of the upper and lower rods and the mill during one rotation of the turn table. There is a tablet machine having a maximum tablet manufacturing capacity of 8,000 per one minute. The compressed tablets are appropriate for mass production, and superior to the molded tablets in respect of accuracy and quality. However, since the dry granules are compressed at the high pressure, the compressed tablets are inferior to the molded tablets as for the solubility and collapsibility.

As mentioned above, although the compressed tablets are superior to the wet tablets in view of efficiency of production, the wet tablets having the excellent solubility and collapsibility are suitable for persons of advanced age and infants to take, who are low in organic and physiological function. Accordingly, by developing a method of effectively mass-producing tablets of high mechanical strength, accuracy and quality which are easy for the persons of advanced age and infants to take, without deteriorating the aforesaid characteristics of the wet tablets, a remarkable merit can be realized in the field of medicines.

SUMMARY OF THE INVENTION

The present invention aims to solve the above-described problems of the prior art, and it is an object of the invention to provide a method and an apparatus for efficiently manufacturing tablets of moist powder which are high in accuracy and quality.

To achieve the above object, according to the invention, a predetermined amount of moist powder is filled and pressurized in receptacles which have been formed of plastic polymer film, and then the surface of the moist powder is leveled by removing the excessive powder, prior to finishing tablets.

Accordingly, since the surface of the moist powder is leveled after it has been pressurized, it is easy to deal with the moist powder so that productivity is improved, a ratio of void defect of a tablet is lowered, and dispersion of weight and size of the tablet is minimized. It is thus possible to manufacture tablets of high precision and quality, which tablets are high in mechanical strength and superior in solubility and collapsibility.

DESCRIPTION OF THE INVENTION

Figure 1:
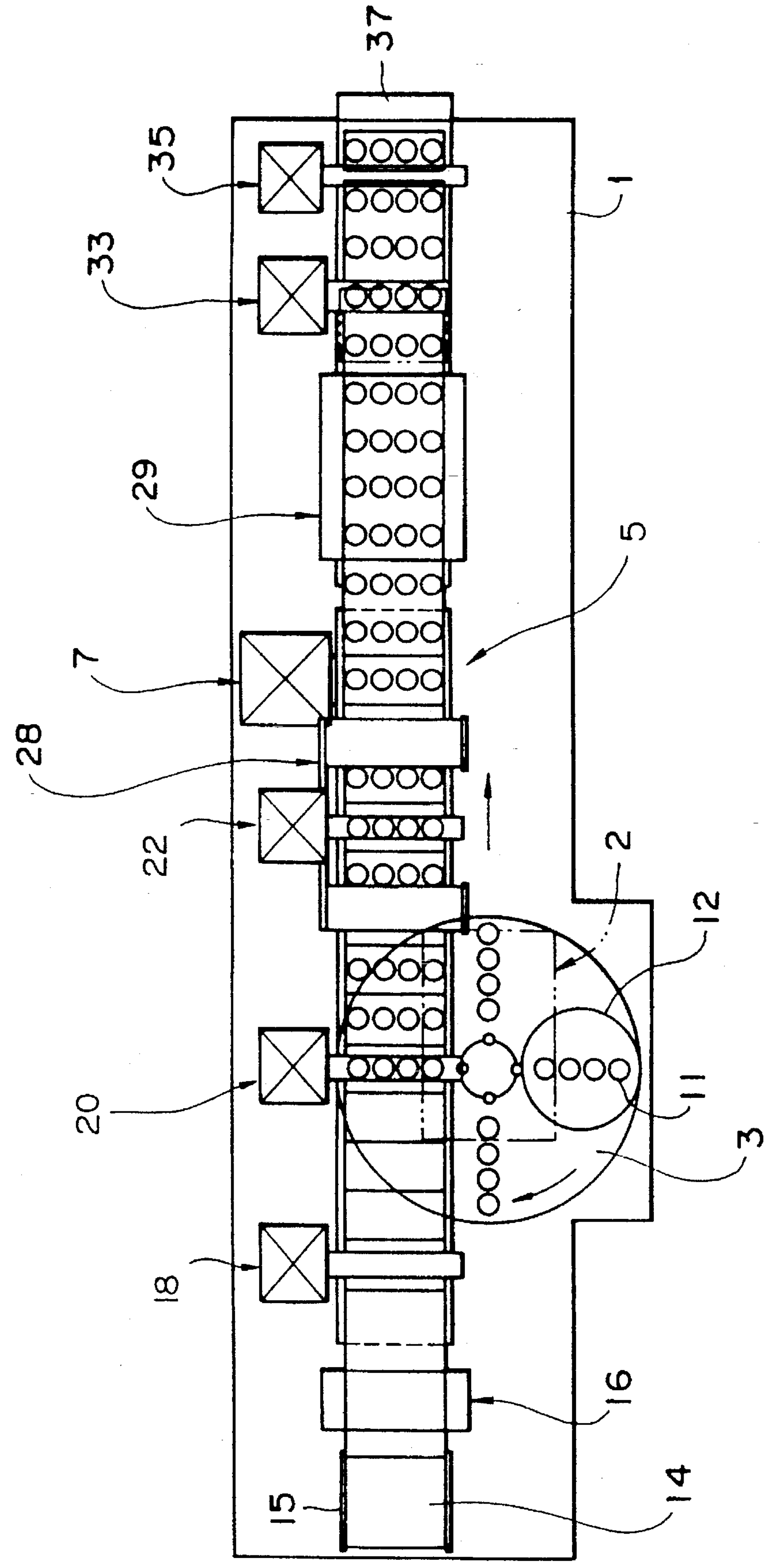
FIG. 1 is a schematic plan view showing a tablet manufacturing apparatus according to one embodiment of the invention.

One preferred embodiment of the present invention will now be described with reference to the drawings. FIG. 1 is a schematic plan view showing a tablet manufacturing apparatus according to the embodiment of the invention, and FIG. 2 is a schematic front elevation of the apparatus.

Figure 2:
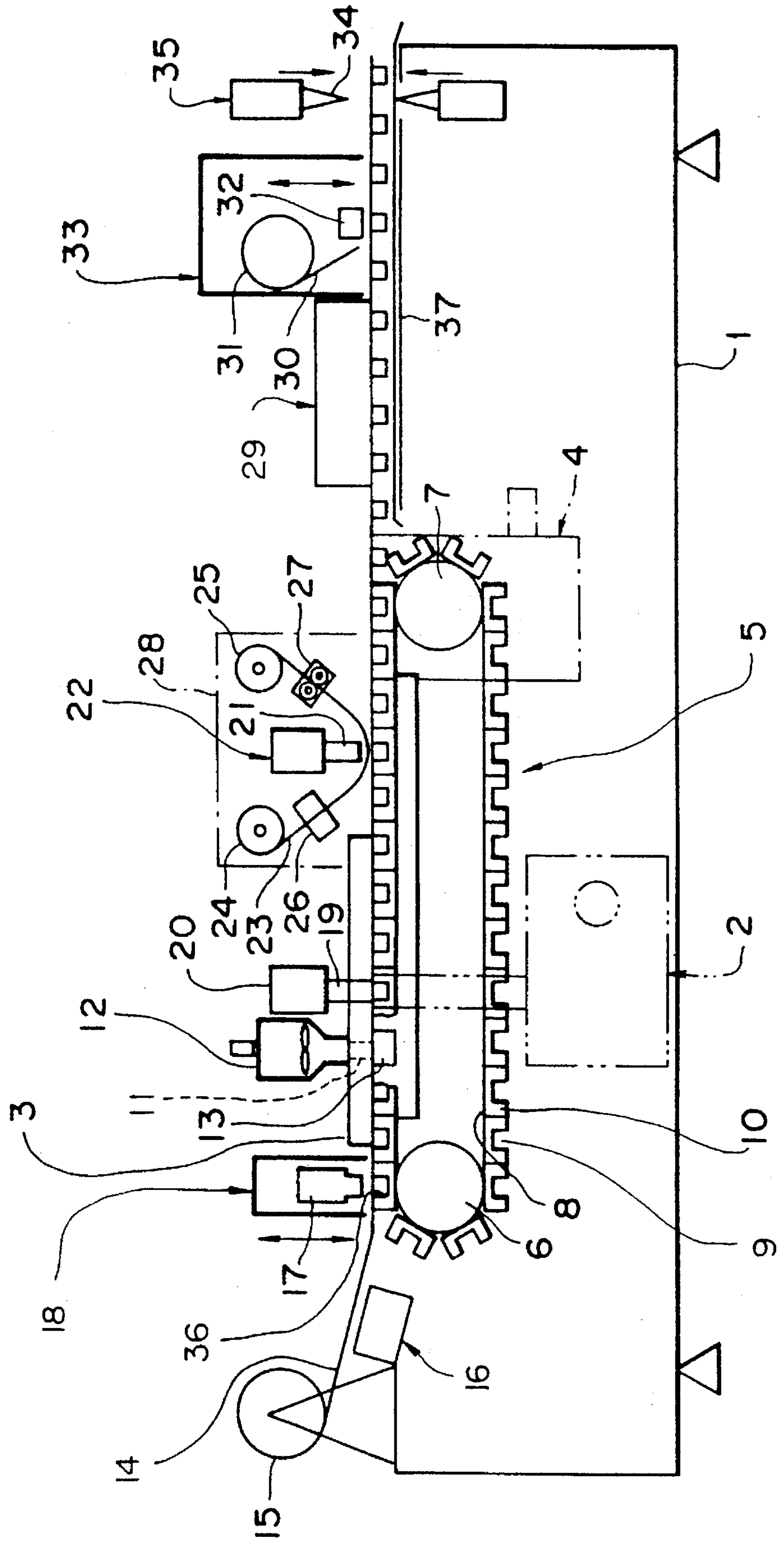
FIG. 2 is a schematic front elevation of the tablet manufacturing apparatus.

Referring to FIGS. 1 and 2, the tablet manufacturing apparatus comprises a long-sized bed 1, a turn table 3 and endless belt means 5 which are provided on the bed 1. The turn table 3 is intermittently driven by an intermittent driving unit 2, and the endless belt means 5 is also intermittently driven by an additional intermittent driving unit 4. The endless belt means 5 is located under the turn table 3 in such a manner that a part of the turn table contacts with the endless belt means. The endless belt means 5 comprises an endless belt 8 extending around sprockets 6 and 7, and a number of dies 10 having mold cavities 9. The dies are connected to the endless belt 8, the dies being spaced from each other. The turn table 3 includes four sets of four filling holes 11 which are arrayed in a radial direction of the turn table. The four sets of the filling holes 11 are provided on the turn table and spaced at an angle of 90 degrees with each other in such a manner that they circumferentially quarter the turn table 3. A set of four mold cavities 9 are formed in each die 10 of the endless belt means 5, the mold cavities having the same largeness as that of the filling holes 11 and spacedly provided in the die at the same intervals as the filling holes. The turn table 3 and the endless belt means 5 are synchronously intermittently driven in order that the four-in-a-set filling holes 11 in the area where the turn table 3 contacts with the endless belt means 5, may coaxially lie above the four-in-a-set mold cavities 9.

A hopper 12 containing moist powder is provided above the turn table 3 in opposition to the endless belt means 5. A hopper receiver 13 is provided below the turn table 3 on the same side as the hopper. The four-in-a-set filling holes 11 are adapted to locate below a supply port of the hopper 12. The lower opening ends of the filling holes 11 are closed by the hopper receiver 13.

A reel 15 around which thermoplastic resin or plastic polymer film 14 is wound, is mounted on the upstream side of the endless belt means 5 at a level higher than an upper face of the endless belt means 5. The tablet manufacturing apparatus also comprises a heater 16, a receptacle forming device 18 including a punch 17, a filling and pressurizing device 20 with a filling rod 19, a finish-forming device 22 having a trimming rod 21, a powder-adhesion preventing device 28, a dryer 29, a sealing unit 33, and a cutting device 35 equipped with a cutter 34. These component parts are arranged in the above order from the upstream side to the downstream side of the tablet manufacturing process. The powder-adhesion preventing device 28 comprises a reel 24 around which a powder-intercepting film 23 is wound, for supplying the film, and a take-up reel 25 for taking up the film. These reels are provided on both sides of the finish-forming device 22. The tablet manufacturing apparatus further comprises a releasing agent coating device 26 for applying a releasing agent to the powder-intercepting film 23, and a tension device 27 for applying tensile force to the powder-intercepting film 23.

An operation of the above-described embodiment will now be described with reference to FIG. 3. At first, as shown in FIG. 3A, the resin film 14 used for forming receptacles is drawn out from the reel 15 so as to be heated and softened by the heater 16 at the upstream side of the endless belt means 5. Then, as shown in FIG. 3B, the punch 17 of the receptacle forming device 18 is lowered to push the resin film 14 into the mold cavities 9 of the die 10 of the endless belt means 5, so that receptacles 36 can be obtained by pressing the resin or plastic polymer film. Part of the resin film 14 is pressedly deformed by the punch and forms the receptacles 36 within the mold cavities of the die 10. As the receptacles 36 move together with the die 10, the resin film 14 is successively drawn out from the reel 15.

Figures 3A, 3B, 3C, 3D, 3E, 3F, 3G, 3H, 3I, 3J:
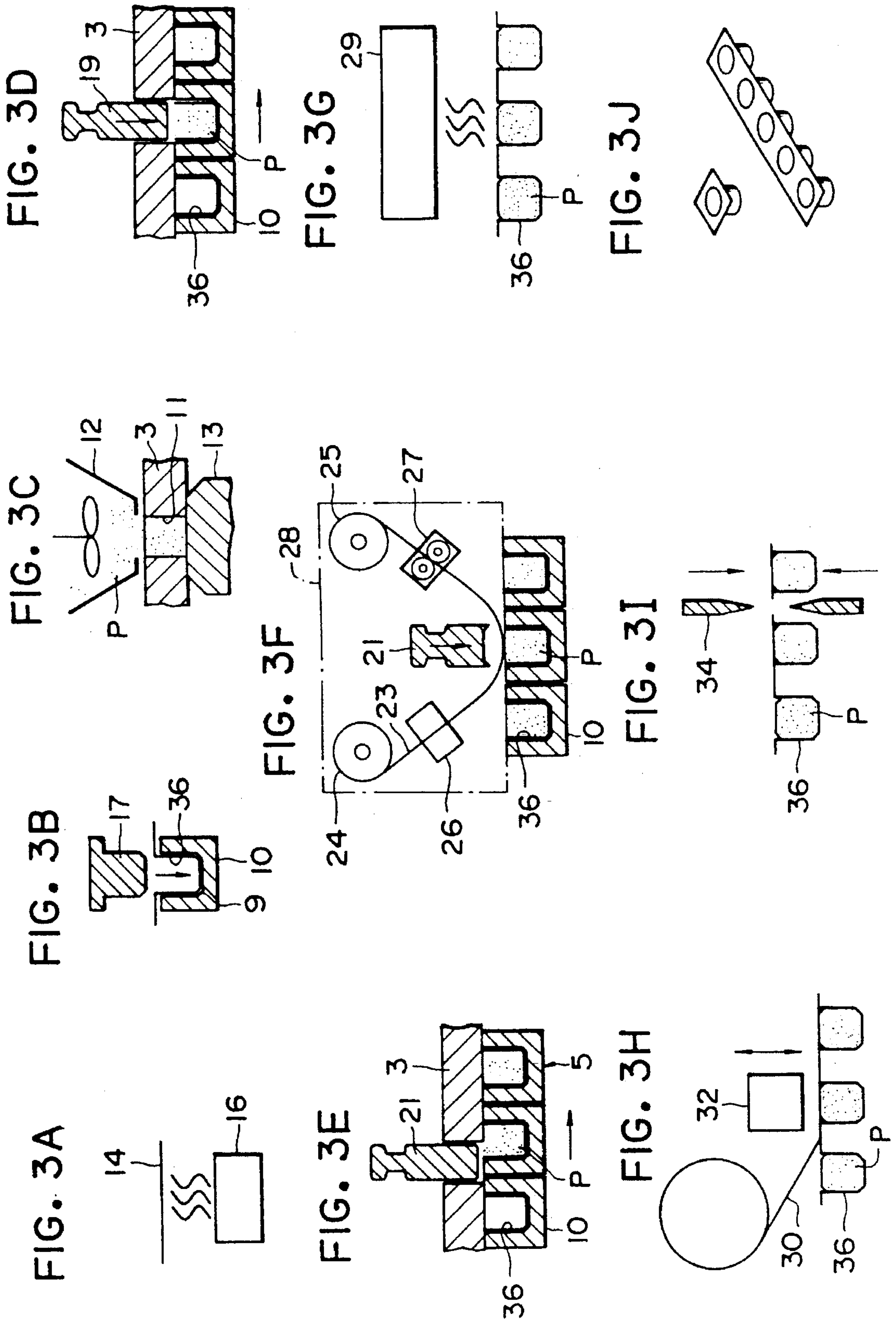
FIGS. 3A to 3J are schematic views showing steps of a tablet manufacturing method according to one embodiment of the invention.

Meanwhile, as illustrated in FIG. 3C, the moist powder P in the hopper 12 is supplied and filled in the filling holes 11 of the turn table 3. At this time, because the lower opening ends of the filling holes 11 are closed by the hopper receiver 13, the moist powder P is surely supplied in the filling holes 11. The volume of the filling hole 11 is predetermined to be larger than that of the receptacle 36 so that the moist powder P slightly remains in the filling hole 11 when the moist powder P is supplied from the filling hole 11 to be filled and pressurized in the receptacle 36 at the next step. After the moist powder P has been supplied in the filling holes 11, the turn table 3 intermittently rotates by 90 degrees and the filling holes 11 are laid above the receptacles 36 formed in the mold cavities of the die 10 of the endless belt means 5. Then, as shown in FIG. 3D, the filling rod 19 of the filling and pressurizing device 20 is lowered to pressurizingly fill the moist powder P from the filling holes 11 into the receptacles 36. The pressure applied to the moist powder P at this time is ordinarily about 5 to 80 kg/cm$^2$ preferably about 5 to 60 kg/cm$^2$, and more preferably about 5 to 40 kg/cm$^2$. Since a larger amount of moist powder P than the volume of the receptacle 36 is supplied in the filling hole 11, the moist powder P slightly remains in the filling hole 11 after the step of pressurizingly filling the moist powder has been completed. As shown in FIG. 3E, by relatively moving the endless belt of the endless belt means 5 with respect to the stationary turn table 3, the moist powder P in the receptacle 36 is leveled by removing the excessive powder on an end face of the receptacle.

Next, as illustrated in 3F, the trimming rod 21 of the finish-forming device 22 is lowered with respect to the moist powder P pressurizingly filled in the receptacle 36, to chamfer the surface of the moist powder P in the receptacle 36. At this time, the powder-intercepting film 23 is located between the trimming rod 21 and the receptacle 36 in order to prevent the moist powder P from sticking to the trimming rod 21. This powder-intercepting film 23 is applied with tensile force by the tension device 27 so that the film can be immediately released from the moist powder P. The film 23 is arranged to be successively withdrawn by the take-up reel 25 in order not to use the once-used surface of the film again. Further, the powder-intercepting film 23 may be previously coated with a releasing agent by the releasing agent coating device 26 on a surface of the film which contacts with the moist powder P, for the purpose of further improving the anti-adhesion ability of the film. The coating of the releasing agent on the surface of the film 23 is unnecessary when the film 23 is made of a material having excellent anti-adhesion property, such as polytetrafluoroethylene. Incidentally, the chamfering is performed to round off the corners of the tablet, for making it easy for a person to swallow the tablet. In this specification, the term "chamfering" means not only processing of the surface of the tablet into a planar surface but also processing of it into a spherical surface. At the time of chamfering, a split line or product mark may be stamped on the surface of the tablet.

It is required to use a releasing agent harmless to a human body when the releasing agent is applied on the powder-intercepting film 23, because the releasing agent sticks to the moist powder P to be manufactured into a tablet. As such releasing agent, there are, for example, stearic acid, calcium stearate, magnesium stearate, talc, cellulose saccharides, starch or the like such as corn starch, silicic anhydride, and a substance used as a smoothening agent for medicine such as silicone oil. However, the releasing agent is not necessarily restricted to the above-described substances. In particular, it is desirable to use stearic acid, calcium stearate, magnesium stearate, and starch or the like such as corn starch and potato starch. Needless to say, it is possible to mix these substances before use.

After chamfering the surface of the moist powder P in the receptacles 36, the receptacles 36 depart from the die 10 at a location where a direction of running of the endless belt turns, while the receptacles 36 move on a carrier tray 37. As shown in FIG. 3G, the receptacles 36 are treated by the drier 29. Then, as shown in FIG. 3H, upper portions of the receptacles 36 are closed by a seal tape 30 drawn out from the reel 31 of the sealing unit 33 and the seal tape 30 is bonded to the upper portions of the receptacles 36 by a stamper 32, thus hermetically sealing the interiors of the receptacles. Thereafter, as illustrated in FIG. 31, the receptacles 36 are cut one by one or by several pieces by the cutter 34 of the cutting device 35. In this way, tablet products as shown in FIG. 3J are finished.

The moist powder P to be used is mixture powder consisting of about 0.0004 to 80 weight % of medical effective ingredients, about 10 to 80 weight % of at least one or more kinds of an excipient, a collapse agent, a binder, an acidity agent, a foaming agent, a perfume, a smoothing agent, a colorant, and an additive agent such as a sweetening agent, and about 1 to 25 weight % of, preferably about 6 to 20 weight % of a wetting agent. As the wetting agent, there can be used a solvent such as water, ethanol, propanol, isopropanol or the like which is approved from the viewpoint of medicine manufacture. Alternatively, a mixture of these solvents or an organic solvent such as hexane which is insoluble with respect to water can be used.

According to the above-described embodiment, the moist powder P supplied in the filling holes 11 of the turn table 3, is pressurizingly filled in the receptacles 36 by the filling rod 19, which receptacles have been formed of the resin film in the mold cavities of the die 10 of the endless belt means 5. Then, the endless belt 8 of the endless belt means 5 is relatively moved with respect to the turn table 3 so as to level the surface of the moist powder P in the receptacles 36 by removing the excessive powder, thus forming it into tablets. Further, the surface of the moist powder P is chamfered by the finish-forming device 22 and the mass of the moist powder is treated by the drier 29. Thereafter, the upper portions of the receptacles 36 are sealed by the sealing device 33 and the receptacles 36 are cut by a predetermined number by means of the cutting device 35. Therefore, it is possible to continuously mass-produce tablets hermetically contained in the receptacles 36.

As mentioned above, according to the invention, after pressurizingly filling a predetermined amount of moist powder in the receptacles formed of resin film, the surface of the moist powder is leveled by removing the excessive powder, thus manufacturing tablets. Accordingly, it is easy to deal with the moist powder so that the productivity is improved, a ratio of void defect of a tablet is lowered, and dispersion of weight and size of the tablets are minimized. Thus, it is possible to manufacture tablets of high precision and quality which are high in mechanical strength and superior in solubility and collapsibility.

Further, according to one embodiment of the invention, there can be obtained the tablet manufacturing apparatus comprising the turn table and the endless belt means, a part of which turn table contacts with the endless belt means. The turn table and the endless belt means relatively move with respect to each other. A number of dies are connected to the endless belt means and spaced from the adjacent dies. The receptacles are continuously formed of resin or plastic polymer film in the mold cavities of the dies of the endless belt means. The moist powder supplied in the filling holes of the turn .table is filled and pressurized in the receptacles of the die by means of the filling rod in the region where the turn table is laid above the endless belt means. The surface of this pressurizingly-filled moist powder is leveled by removing the excessive amount when the endless belt of the endless belt means is relatively moved with respect to the turn table, thus forming a tablet. Therefore, according to the invention, it is possible to realize a tablet manufacturing apparatus which is appropriate for mass-production and which is of high producing efficiency.

What is claimed is:

1. A tablet manufacturing method comprising the steps of:

forming receptacles by pressing plastic polymer film;

filling a predetermined amount of moist powder in said receptacles under a pressurized condition; and leveling the surface of said pressurizingly filled moist powder by removing the excessive powder.

2. A tablet manufacturing method according to claim 1, further comprising the step of chamfering the surface of the moist powder within the receptacle for rounding off the corners of the mass of the moist powder.

3. A tablet manufacturing method according to claim 2, further comprising the step of coating a releasing agent on the surface of the moist powder to be chamfered before it is chamfered.

4. A tablet manufacturing method according to claim 2, further comprising the step of coating a releasing agent on an end face of a trimming rod for chamfering before the surface of the moist powder is chamfered.

5. A tablet manufacturing method according to claim 1, further comprising the step of drying the moist powder in the receptacles.

6. A tablet manufacturing method according to claim 2, further comprising the step of drying the moist powder in the receptacles.

7. A tablet manufacturing method according to claim 3, further comprising the step of drying the moist powder in the receptacles.

8. A tablet manufacturing method according to claim 4, further comprising the step of drying the moist powder in the receptacles.

9. A tablet manufacturing method according to claim 5, further comprising the step of protecting the surface of the moist powder in the receptacles with a seal cover, thereby hermetically closing the receptacles.

10. A tablet manufacturing method according to claim 6, further comprising the step of protecting the surface of the moist powder in the receptacles with a seal cover, thereby hermetically closing the receptacles.

11. A tablet manufacturing method according to claim 7, further comprising the step of protecting the surface of the moist powder in the receptacles with a seal cover, thereby hermetically closing the receptacles.

12. A tablet manufacturing method according to claim 8, further comprising the step of protecting the surface of the moist powder in the receptacles with a seal cover, thereby hermetically closing the receptacles.

13. A tablet manufacturing method according to claim 9, wherein the pressure upon pressurizingly filling the moist powder is substantially 5 to 80 $kg/cm^2$.

14. A tablet manufacturing method according to claim 10, wherein the pressure upon pressurizingly filling the moist powder is substantially 5 to 80 $kg/cm^2$.

15. A tablet manufacturing method according to claim 11, wherein the pressure upon pressurizingly filling the moist powder is substantially 5 to 80 $kg/cm^2$.

16. A tablet manufacturing method according to claim 12, wherein the pressure upon pressurizingly filling the moist powder is substantially 5 to 80 $kg/cm^2$.

17. A tablet manufacturing apparatus comprising:

conveyer means to which a plurality of dies for forming receptacles are connected;

means for forming the receptacles in said dies by pressing plastic polymer film;

means for pressurizingly filling a predetermined amount of moist powder in the receptacles formed in said dies; and means for leveling the surface of said pressurizingly filled moist powder by removing the excessive powder.

18. A tablet manufacturing apparatus according to claim 17, further comprising means for chamfering the surface of the moist powder within the receptacle for rounding off the corners of the mass of the moist powder.

19. A tablet manufacturing apparatus according to claim 18, further comprising means for coating a releasing agent on the surface of the moist powder to be chamfered before it is chamfered.

20. A tablet manufacturing apparatus according to claim 18, further comprising means for coating a releasing agent on an end face of a trimming rod for chamfering before the surface of the moist powder is chamfered.

21. A tablet manufacturing apparatus according to claim 17, further comprising means for drying the moist powder in the receptacles.

22. A tablet manufacturing apparatus according to claim 18, further comprising means for drying the moist powder in the receptacles.

23. A tablet manufacturing apparatus according to claim 19, further comprising means for drying the moist powder in the receptacles.

24. A tablet manufacturing apparatus according to claim 20, further comprising means for drying the moist powder in the receptacles.

25. A tablet manufacturing apparatus according to claim 21, further comprising means for protecting the surface of the moist powder in the receptacles with a seal cover, thereby hermetically closing the receptacles.

26. A tablet manufacturing apparatus according to claim 22, further comprising means for protecting the surface of the moist powder in the receptacles with a seal cover, thereby hermetically closing the receptacles.

27. A tablet manufacturing apparatus according to claim 23, further comprising means for protecting the surface of the moist powder in the receptacles with a seal cover, thereby hermetically closing the receptacles.

28. A tablet manufacturing apparatus according to claim 24, further comprising means for protecting the surface of the moist powder in the receptacles with a seal cover, thereby hermetically closing the receptacles.

29. A tablet manufacturing apparatus comprising:

a hopper containing moist powder therein;

a turn table including a plurality of sets of filling holes into which the moist powder is successively supplied from said hopper, said sets of filling holes being provided on the turn table and circumferentially spaced at intervals;

endless belt means including a plurality of receptacle forming dies with mold cavities which are connected thereto and spaced from the adjacent ones in the longitudinal direction of the endless belt means, over which endless belt means a part of said turn table is laid, the mold cavities being coaxially laid below said filling holes in the area where the part of the turn table is laid over the endless belt means;

receptacle forming means for forming receptacles by pressing plastic polymer film in the mold cavities of said receptacle forming dies;

filling and pressurizing means for filling and pressurizing the moist powder from said filling holes in the receptacles formed in the mold cavities of said dies by means of a filling pin in the area where the part of the turn table is laid over the endless belt means;

finish-forming means for chamfering the surface of the moist powder pressurizingly filled in said receptacles to thereby round off the corners of the mass of the moist powder by means of a trimming rod;

adhesion-preventing means for preventing the moist powder from sticking to the trimming rod at the time of said chamfering;

sealing means for protecting said receptacles with a seal cover to hermetically close the receptacles containing the moist powder therein;

cutting means for cutting said receptacles by a predetermined number; and intermittent drive means for intermittently synchronously driving said turn table and said endless belt means.

* * * * *

UNITED STATES PATENT AND TRADEMARK OFFICE

CERTIFICATE OF CORRECTION

PATENT NO. : 5,603,880

DATED : February 18, 1997

INVENTOR(S) : Heizaburo Kato et al

It is certified that error appears in the above-indentified patent and that said Letters Patent is hereby corrected as shown below:

Title Page, Item [73], under Assignee, add --and Eisai Co. Ltd., Tokyo, Japan--.

Signed and Sealed this

Sixth Day of July, 1999

*Attest:*

Q. TODD DICKINSON

*Attesting Officer* *Acting Commissioner of Patents and Trademarks*